(12) United States Patent
Hussain

(10) Patent No.: US 7,198,722 B2
(45) Date of Patent: Apr. 3, 2007

(54) PROCESS FOR PRE-TREATING AND DESALINATING SEA WATER

(76) Inventor: Mohammed Azam Hussain, 4306 Kingfisher Dr., Houston, TX (US) 77035

(*) Notice: Subject to any disclaimer, the term of this patent is extended or adjusted under 35 U.S.C. 154(b) by 245 days.

(21) Appl. No.: 10/605,974

(22) Filed: Nov. 11, 2003

(65) Prior Publication Data

US 2005/0098499 A1    May 12, 2005

(51) Int. Cl.
   B01D 61/00   (2006.01)
   C02F 1/02    (2006.01)
   B03D 3/00    (2006.01)
   A61M 1/16    (2006.01)

(52) U.S. Cl. .............. 210/651; 210/180; 210/175; 210/195.2; 210/723; 210/727; 210/767; 210/639

(58) Field of Classification Search ......... 210/650, 210/652, 180, 175, 639, 696, 638, 651, 749, 210/767, 705, 703, 727, 722–724, 726, 737, 210/195.2; 423/169, 311; 203/10
See application file for complete search history.

(56) References Cited

U.S. PATENT DOCUMENTS

| | | | | |
|---|---|---|---|---|
| 2,395,743 A * | 2/1946 | Kannenberg et al. | ....... | 438/104 |
| 2,415,074 A * | 2/1947 | Clark et al. | ........... | 423/160 |
| 2,796,395 A * | 6/1957 | Roberts | ........... | 204/525 |
| 3,128,248 A * | 4/1964 | Suzuki | ........... | 210/706 |
| 3,350,292 A * | 10/1967 | Weinberger et al. | ....... | 210/651 |
| 3,740,330 A * | 6/1973 | Kneale | ........... | 210/665 |
| 4,036,749 A * | 7/1977 | Anderson | ........... | 210/638 |
| 4,083,781 A * | 4/1978 | Conger | ........... | 210/651 |
| 4,170,328 A * | 10/1979 | Kirk et al. | ........... | 494/37 |
| 4,462,713 A * | 7/1984 | Zurcher et al. | ........... | 405/36 |
| 4,634,533 A * | 1/1987 | Somerville et al. | ....... | 210/722 |
| 4,670,150 A * | 6/1987 | Hsiung et al. | ........... | 210/636 |
| 5,626,825 A * | 5/1997 | Verri | ........... | 423/155 |
| 6,113,797 A * | 9/2000 | Al-Samadi | ........... | 210/652 |
| 6,126,834 A * | 10/2000 | Tonelli et al. | ........... | 210/652 |
| 6,187,200 B1 * | 2/2001 | Yamamura et al. | ....... | 210/652 |
| 6,402,956 B1 * | 6/2002 | Andou et al. | ........... | 210/650 |
| 6,428,705 B1 * | 8/2002 | Allen et al. | ........... | 210/638 |
| 6,461,514 B1 * | 10/2002 | Al-Samadi | ........... | 210/652 |
| 6,508,936 B1 * | 1/2003 | Hassan | ........... | 210/652 |
| 6,679,988 B2 * | 1/2004 | Gsell | ........... | 210/181 |
| 6,758,977 B2 * | 7/2004 | Michalski et al. | ....... | 210/696 |

* cited by examiner

Primary Examiner—Ana Fortuna
(74) Attorney, Agent, or Firm—Richard D. Fuerle

(57) ABSTRACT

Water containing dissolved salts, such as calcium sulfate, calcium chloride, magnesium sulfate, magnesium chloride, sodium carbonate, sodium chloride, sodium sulfate, calcium bicarbonate, and mixtures thereof, is treated to reduce the concentration of those salts. About 0.1 to about 60 g/L of sodium hydroxide, sodium carbonate, potassium hydroxide, potassium carbonate, calcium hydroxide, calcium carbonate, aluminum hydroxide, aluminum sulfate, aluminum potassium sulfate, and mixtures thereof is added to the water, whereby a precipitate forms in the water. The precipitate is separated from said water and the water is desalinated using reverse osmosis, flash evaporation, or another method. The process is preferably performed by first adding calcium oxide or calcium hydroxide, separating the precipitate that forms, then adding sodium hydroxide and sodium carbonate to form a second precipitate.

17 Claims, 2 Drawing Sheets

PROCESS FOR PRE-TREATING AND DESALINATING SEA WATER

BACKGROUND OF INVENTION

This invention relates to a process for pre-treating sea water so that it can be more effectively desalinated. In particular, it relates to a process in which certain compounds are added to sea water, which results in the precipitation of salts from the sea water, followed by desalination of the treated water.

As populations increase across the world, the supply of fresh water is not increasing as rapidly. This has resulted in local and national conflicts over water rights.

About 70 percent of the world's population lives within 50 miles of the sea and the sea could provide an almost inexhaustible source of fresh water if it could be inexpensively desalinated. The two principal processes for desalinating sea water are reverse osmosis and flash evaporation.

In reverse osmosis, the sea water is forced through membranes, which prevent most of the salts in the sea water from passing. In flash evaporation, the sea water is heated in special coils and evaporated water is condensed, leaving behind the salts. In both processes, only about 30 to 40% of the water is recovered and the remaining water, in which the salts are more highly concentrated, is dumped back into the sea, which can adverse affect marine life.

SUMMARY OF INVENTION

I have invented a process in which water containing dissolved salts is treated so that when the treated water is desalinated a higher percentage of fresh water can be recovered from it. In the process of this invention, certain compounds are added to the sea water, which results in the precipitation of some of the salts. The treated sea water has a lower salt concentration than did the original sea water and different salts are present in it. As a result, when the treated sea water is desalinated using reverse osmosis, flash evaporation, or another process, more fresh water is recovered.

Because salts such as calcium and magnesium bicarbonates and sulfates are removed in the pre-treatment process of this invention, the water can be heated to higher temperatures when it is desalinated in a flash evaporation process. Currently, temperatures above about 70° C. may result in the precipitation of salts in these processes, but since the pre-treatment process removes some of these salts, temperatures in excess of 70° C. can now be used, which reduces maintenance and extends the life of the equipment. When the water is desalinated using reverse osmosis after the pre-treatment process of this invention, there is less maintenance of the membranes and the life of the equipment is extended.

The compounds used in the process of this invention are safe and biodegradable and the sea water rejected in the desalination process causes less ecological damage when disposed of.

The solids that are precipitated from the sea water in the process of this invention are valuable minerals and can be used in industrial and agricultural processes or they can be added to distilled water to make it suitable for drinking.

DETAILED DESCRIPTION

Figure 1:
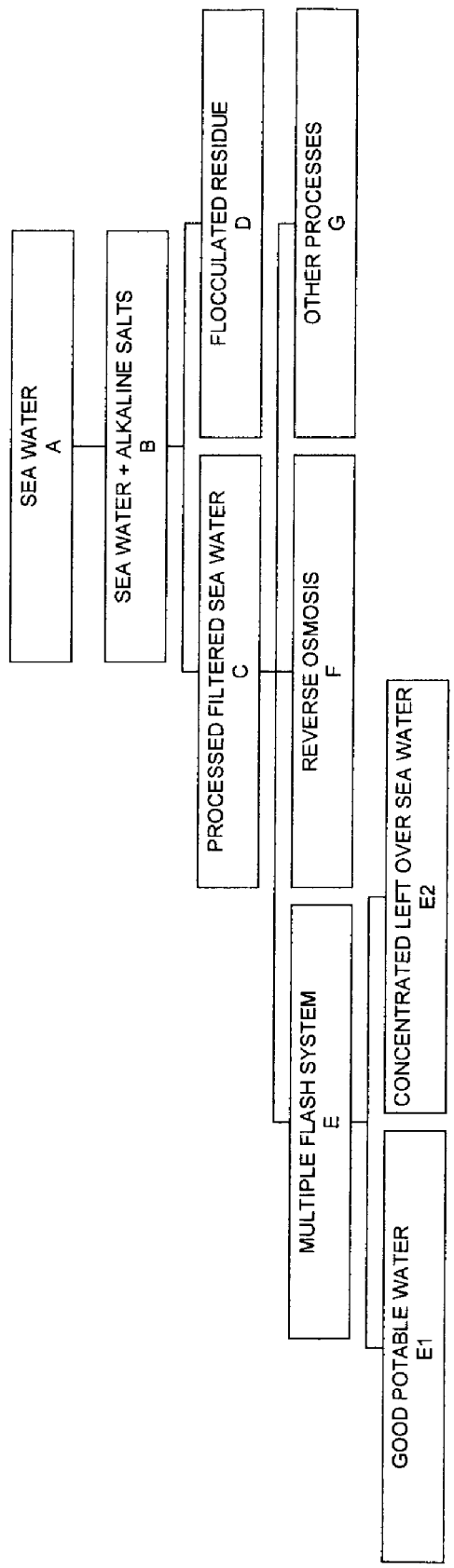
FIG. 1 is a flow chart illustrating a process according to this invention.

The pre-treatment process of this invention is applicable to any aqueous solution of salts, such as sea water (including ocean water), brackish water (i.e., water containing a lower concentration of salts than sea water), or industrial brine solutions (such as from oil or gas drilling or from underground wells). It is particularly applicable to solutions containing dissolved calcium sulfate, calcium chloride, magnesium sulfate, magnesium chloride, sodium carbonate, sodium chloride, sodium sulfate, and calcium carbonate. For example, the process may be used to treat water containing about 0.1 to about 60 g/L calcium, about 0.1 to about 60 g/L magnesium, about 0.1 to about 60 g/L potassium, about 0.1 to about 60 g/L sodium, about 0.1 to about 60 g/L bicarbonate, about 0.1 to about 60 g/L carbonate, about 0.1 to about 60 g/L chlorine, and about 0.1 to about 60 g/L sulfate. The composition of sea water differs somewhat depending on its location. In the major ocean basins, 3.5% of the weight of sea water is, on average, dissolved salts and 96.5% is water, so that typically 1 kg sample of sea water contains 35 grams of salt. Thus, the average ocean salinity is approximately 35 parts per thousand. The salinity of ocean surface water is associated with latitude. Salinity can range from 15 parts per thousand in some coastal areas with high precipitation and river inflow, to well above 42 parts per thousand in some landlocked seas with high evaporation and low freshwater input. For example, the typical sea water international standard from Wormly, England contains about 0.4 g/L calcium, about 1.3 g/L magnesium, about 0.38 g/L potassium, about 10.7 g/L sodium, about 0.12 g/L bicarbonate, less than 0.002 g/L carbonate, about 19.4 g/L chloride, and about 2.7 g/L sulfate.

The water to be treated may be filtered first to remove sediment, marine life, and other solids. A compound selected from sodium hydroxide, sodium carbonate, sodium silicate, potassium hydroxide, potassium carbonate, calcium oxide, calcium hydroxide, calcium carbonate, aluminum hydroxide, aluminum sulfate, aluminum potassium sulfate, or a mixture thereof is mixed into the water. The preferred compounds are sodium hydroxide, sodium carbonate, calcium oxide, calcium hydroxide, and mixtures thereof. These compounds may be added as solids or, if it is more convenient, an aqueous solution of the compounds can be prepared and the solution can be added. The total amount of the compounds used may be about 0.1 to about 60% by weight (or by volume); less may not be effective and more may not dissolve. The preferred amount is about 0.2 to about 40% by weight (or by volume).

Shortly after the compounds are mixed into the water a white or brownish white precipitate will form and settle out. Depending upon the compound(s) added, the composition of the water, and other factors, the precipitate may consist of mixtures of calcium sulfate, calcium chloride, magnesium sulfate, magnesium chloride, sodium bicarbonate, sodium chloride, and other salts. The precipitate can be separated from the water by decantation followed by filtration, or any other suitable means.

The remaining treated water typically has a lower concentration of divalent cations, such as calcium and magnesium, and certain anions, such as bicarbonate, chloride, and sulfate, but a has a higher concentration of monovalent cations, such as sodium and potassium, and the carbonate anion. Thus, the pre-treatment not only removes salts from the water and reduces its salinity, it also substitutes monovalent cations for divalent cations. At this stage, the salinity of the original water may be reduced by about 20 to about 80% and its pH may be between about 8 and about 14.

For treating sea water, it is preferable to perform the pre-treatment using two separate additions of the compounds because that procedure removes more of the dissolved salts than does a single addition. In the first addition, about 0.04 to about 40 g/L of calcium oxide (quick lime) is added to the water. The calcium oxide reacts exothermically with the water to form calcium hydroxide. Alternatively, calcium hydroxide (slaked lime) can be added directly to the water, but it is preferably to use calcium oxide as more of the calcium hydroxide dissolves when it is formed by the reaction of calcium oxide with water. The preferred amount of calcium oxide is about 0.07 to about 30 g/L. This first addition results in the formation of a precipitate which is primarily calcium sulfate. It also raises the pH of the sea water from about 7.0 to about 8.5. The precipitate may be removed by decantation and/or filtration and the clear water is used in the second addition.

In the second addition, of about 0.1 to about 60 g/L of sodium carbonate and about 0.04 to about 40 g/L of sodium hydroxide are added. The preferred amount is about 0.12 to about 50 g/L of sodium carbonate and about 0.9 to about 34 g/L of sodium hydroxide. The compounds may be added either as a mixture or sequentially but it is preferably to add them as a mixture or simultaneously. The compounds may be added as dry solids or as concentrated liquids. Both sodium hydroxide and sodium carbonate are needed to increase the precipitation of calcium, magnesium, and iron (ferrous or ferric) as hydroxides and carbonates. The addition results in the formation of a white gelatinous precipitate which is primarily magnesium hydroxide, but may also contain some chlorides and other salts. The precipitate may be separated from the water by decantation and/or filtration.

The resulting clear water may have a mineral content less than 14,000 ppm (parts per million by weight), which is close to that of brackish seawater.

The pre-treatment can be performed as a continuous process or as a batch process. In a continuous process, the compounds are metered into the water, either in solution or as solids. In a batch process, the water is placed in a large container and the appropriate amounts of the compounds are added, usually as solids.

The pH of the pre-treated water may be in the range of about 8 to about 14. In order to reduce damage to the desalinating equipment, it may be preferable to reduce the pH of the water before desalinating it, though the pH reduction may also be performed after desalination. The pH can be lowered by the addition of an acid and the pH can be monitored during the addition of the acid to arrive at the desired pH, which is typically between about 6.5 and about 8.5. Acids suitable for this purpose include hydrochloric acid, sulfuric acid, acetic acid, and citric acid, though other acids may be used as well. The preferred acid is hydrochloric acid because the components of this acid exist in sea water.

After the pre-treatment, the water is desalinated to further remove salts therefrom. This can be accomplished by a variety of different methods, but the preferred methods are reverse osmosis, flash evaporation, or combinations thereof because these methods are effective and less expensive than other desalination methods. After desalination, the water should have a dissolved mineral (salt) content of less than about 500 ppm. The process of this invention may recover about 30 to about 80% of the water treated. The remaining water can be used in the synthesis of alkaline sodium-based compounds or it can be returned to the ocean.

FIG. 1 illustrates the process of this invention. In FIG. 1, sea water (A) is mixed with the compounds as hereinabove described to produce processed filtered sea water (C) and a flocculated residue (D). The processed filtered sea water is then desalinated using a multiple flash system (E), reverse osmosis (F), or another process (G) to produce good potable water (E-1) and concentrated left over sea water (E-2).

Figure 2:
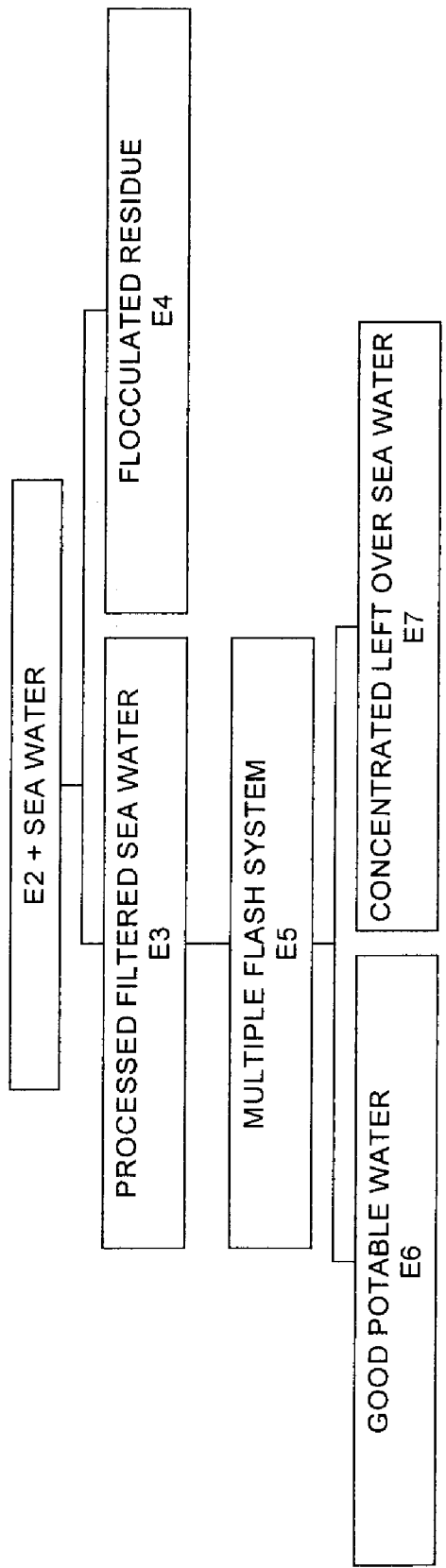
FIG. 2 is a flow chart illustrating an alternative process according to this invention where recycling is used.

Some of the compounds added in the pretreatment may remain in the water after it has been desalinated, especially if an excess amount of the compounds was added. As a result, the water remaining after desalination may still contain compounds that were added during the our pre-treatment process. It is advantageous to recycle this water to make use of those compounds. Also, returning the water to the ocean may damage marine life. And, it the water was desalinated using flash evaporation, its heat can be recovered during recycling. FIG. 2 illustrates the recycling process. In FIG. 2, the water to be recycled (E-2) is added to fresh sea water and the mixture is treated as in FIG. 1, which produces a flocculated precipitate (E-4) and processed filtered sea water (E-3). The processed filtered sea water (E-3) is then desalinated, as by a multiple flash system (E-5), to produce good potable water (E-6) and left over concentrated sea water (E-7), which can again be recycled any number of times. If the concentration of the compounds in the mixture of the recycled water and the fresh sea water is not within the hereinabove-specified range, additional compounds should be added to the mixture to bring their concentration within that range. Water that is no longer recycled can be used in various other processes, such as manufacturing chlorine and caustic from its brine content using a membrane electrolytic cell.

The following example further illustrates this invention.

EXAMPLE

A 2000 ml beaker was filled with 1000 ml of sea water at room temperature (28° C.). To the sea water was added 2.8 g calcium oxide. After stirring for 1 to 5 minutes, the mixture was permitted to settle overnight. A white precipitate of calcium sulfate and calcium hydroxide formed. The clear water was decanted and filtered through 100 micron filter paper into a second clean 2000 ml beaker. The pH of this water was 7.5.

To the filtered water was added 21.5 g dry sodium carbonate and 12.5 g dry sodium hydroxide. The water was agitated to dissolve the added compounds. A gelatinous white precipitate formed, which was permitted to settle overnight. This precipitate is believed to consist of magnesium carbonate, magnesium hydroxide, sodium bicarbonate, and sodium chloride. The clear water was decanted through 100 micron filter paper into a third 2000 ml beaker. About 85 vol % of the original water was recovered. The pH of this water was about 10. This pre-treated sea water can now be used in a desalination process. The following table gives the results of this experiment:

| Ion | Reporting Limit (mg/L)* | Original Seawater (mg/L) | Treated Seawater (mg/L) | Removed (mg/L) | Added (mg/L) | Wt % |
|---|---|---|---|---|---|---|
| Calcium | 0.05 | 372 | 7.65 | 364.35 | | −97.94 |
| Magnesium | 0.10 | 1030 | 1.73 | 1028.27 | | −99.83 |
| Potassium | 0.10 | 315 | 336 | | 21 | +6.67 |
| Sodium | 0.10 | 8410 | 23,200 | | 14,790 | +175.86 |
| Bicarbonate | 2.00 | 114 | <2.00 | 112 | | −98.25 |
| Carbonate | 2.00 | <2.00 | 8440 | | 8438 | +421,900 |
| Chloride | 2.00 | 14,200 | 6200 | 8000 | | −56.34 |
| Sulfate | 1.00 | 2280 | 995 | 1285 | | −56.36 |

*precision of measurements

The table shows that if the chloride ion is used as a measurement of salinity, the salinity was reduced 56.34% as the following calculations show:

| | | |
|---|---|---|
| 1.80655 × 14,2000 | = 25,654 | 100% |
| 1.80655 × 6,200 | = 11,201 | 43.66% |
| Salinity reduction | 14,453 | 56.35% |

The flocculant produced was also analyzed. The following tables give the results of that analysis:

| | Reporting limit (mg/Kg) | Results (mg/Kg) |
|---|---|---|
| Ion | | |
| Calcium | 10 | 79,100 |
| Magnesium | 10 | 228,000 |
| Potassium | 10 | 500 |
| Sodium | 10 | 36,000 |
| Parameter | | |
| Chloride | 2.00 | 90,000 |
| Sulfate | 485 | <485 |

The invention claimed is:

1. A process for treating sea water comprising
(A) adding to said sea water about 0.1 to about 60 g/L of a compound selected from the group consisting of sodium hydroxide, sodium carbonate, potassium hydroxide, potassium carbonate, calcium oxide, calcium hydroxide, calcium carbonate, aluminum hydroxide, aluminum sulfate, aluminum potassium sulfate, and mixtures thereof, whereby a precipitate of a calcium compound forms in said water;
(B) separating said precipitate from said water; and
(C) desalinating said water to a first stream that has lower concentration of dissolved solids and an second stream that has a higher concentration of dissolved solids, and
  (1) a mixture is formed of said second stream and said sea water;
  (2) a sufficient amount of said compound is added to said mixture to bring its concentration within a range of about 0.1 to about 60 wt %; and
  (3) said mixture is recycled to step (B).

2. A process according to claim 1 wherein prior to step (A) said sea water is filtered.

3. A process according to claim 1 wherein said sea water is desalinated using reverse osmosis.

4. A process according to claim 1 wherein said sea water is desalinated using flash evaporation.

5. A process according to claim 1 wherein said solid precipitate is separated by filtration.

6. A process according to claim 1 wherein acid is added to said sea water after step (B) to lower the pH of said sea water to between about 6.5 and about 8.5.

7. A process according to claim 6 wherein the pH of said sea water is adjusted before step (C).

8. A process according to claim 1 wherein said compound is selected from the group consisting of calcium oxide, calcium hydroxide, sodium hydroxide, sodium carbonate, and mixtures thereof.

9. A process according to claim 1 wherein the amount of said compound is about 0.2 to about 40 g/L.

10. A process according to claim 1 wherein said desalinating is performed at a temperature in excess of 70° C.

11. A process according to claim 1 wherein said compounds are added in two steps, a first step in which about 0.04 to about 40 g/L of calcium hydroxide, calcium oxide, or a mixture thereof is added, whereby a first precipitate is formed and is separated from the water, and a second step in which about 0.1 to about 60 g/L of sodium carbonate and about 0.04 to about 40 g/L of sodium hydroxide is added, whereby a second precipitate is formed and is separated from the water.

12. A process for treating sea water to reduce the concentration of salts therein comprising
(A) adding to said sea water about 0.04 to about 40 g/L of a compound selected from the group consisting of calcium hydroxide, calcium oxide, and mixtures thereof, whereby a first precipitate that comprises calcium hydroxide is formed;
(B) separating said first precipitate from said water;
(C) adding to said water about 0.01 to about 60 g/L sodium carbonate and about 0.04 to about 40 g/L sodium hydroxide, whereby a second precipitate that comprises magnesium hydroxide is formed;
(D) separating said second precipitate from said water; and
(E) desalinating said water using reverse osmosis to produce a first stream that has a lower concentration of dissolved solids and a second stream that has a higher concentration of dissolved solids, and
  (1) a mixture is formed of said second stream and said sea water;
  (2) a sufficient amount of said compound is added to said mixture to bring its concentration within a range of about 0.4 to about 40 g/L; and
  (3) said mixture is recycled to step (C).

13. A process according to claim 12 wherein, in step (A), said compound is calcium oxide.

14. A process according to claim 13 wherein the amount of said calcium oxide added is about 0.07 to about 30 g/L, the amount of said sodium carbonate added is about 0.12 to about 50 g/L, and the amount of said sodium hydroxide added is about 0.9 to about 34 g/L.

15. A process for treating sea water to reduce the concentration of dissolved salts therein comprising
- (A) adding to said sea water about 0.4 to about 40 g/L of a compound selected from the group consisting of calcium hydroxide, calcium oxide, and mixtures thereof, whereby a first precipitate that comprises calcium hydroxide is formed;
- (B) separating said first precipitate from said water;
- (C) adding to said water about 0.1 to about 60 g/L sodium carbonate and about 0.04 to about 40 g/L sodium hydroxide , whereby a second precipitate that comprises magnesium hydroxide is formed;
- (D) separating said second precipitate from said water; and
- (E) desalinating said water using flash evaporation to produce a first stream that has a lower concentration of dissolved solids and a second stream that has a higher concentration of dissolved solids, and
  - (1) a mixture is formed of said second stream and said sea water;
  - (2) a sufficient amount of said compound is added to said mixture to bring its concentration within a range of about 0.4 to about 40 g/L; and
  - (3) said mixture is recycled to step (C).

16. A process according to claim 15 wherein, in step (A), said compound is calcium oxide.

17. A process according to claim 1 wherein the amount of said calcium oxide added is about 0.07 to about 30 g/L, the amount of said sodium carbonate added is about 0.12 to about 50 g/L, and the amount of said sodium hydroxide added is about 0.9 to about 34 g/L.

* * * * *